United States Patent [19]

Dettmer

[11] Patent Number: 4,553,214

[45] Date of Patent: Nov. 12, 1985

[54] ANGLE BASED STROKE GENERATOR

[75] Inventor: Jay R. Dettmer, Columbia, Md.

[73] Assignee: Sperry Corporation, New York, N.Y.

[21] Appl. No.: 394,362

[22] Filed: Jul. 1, 1982

[51] Int. Cl.[4] ........................ G06F 15/40; G06F 15/20

[52] U.S. Cl. .................................... 364/521; 340/727; 340/739; 364/518; 382/46

[58] Field of Search ............... 364/518, 520, 521, 719; 340/724, 727, 739, 720, 723; 382/44, 46

[56] References Cited

U.S. PATENT DOCUMENTS

| | | | |
|---|---|---|---|
| 3,811,110 | 5/1974 | Inose et al. | 382/46 |
| 3,899,662 | 8/1975 | Kreeger et al. | 340/720 X |
| 4,027,148 | 5/1977 | Rosenthal | 364/521 X |
| 4,115,863 | 9/1978 | Brown | 364/719 X |
| 4,146,925 | 3/1979 | Green et al. | 364/521 |
| 4,205,309 | 5/1980 | Music | 340/739 |
| 4,228,432 | 10/1980 | Osborne | 340/727 X |
| 4,245,321 | 1/1981 | Gennetten | 340/727 X |
| 4,467,412 | 8/1984 | Hoff | 340/727 X |

*Primary Examiner*—Errol A. Krass
*Assistant Examiner*—Kevin J. Teska
*Attorney, Agent, or Firm*—Howard P. Terry

[57] ABSTRACT

Stroke display apparatus generates symbols or characters on a display screen and permits dynamic rotation or translation of those characters without placing a computation burden on the host processor. The characters are represented as a series of connected line segments, or blank segments, each having a characteristic direction or vector angle. Each of the line segments are generated by successively adding incremental Δx and Δy steps to an x,y position until the desired length is achieved. The character is rotated by adding a predetermined offset angle to each characteristic vector angle and then by converting the rotated vector angle into incremental Δx and Δy steps. Character translation is accomplished by including an extra, typically blanked, line segment command before the character is drawn.

5 Claims, 6 Drawing Figures

UNROTATED

ROTATED

ANGLE BASED STROKE GENERATOR

BACKGROUND OF THE INVENTION

1. Field of the Invention

The invention relates to symbol generators particularly with regard to digital to stroke generators. More specifically, the invention relates a digital stroke generator having the capacity to dynamically rotate a symbol placing only a minimal computation burden on the host processor.

2. Description of the Prior Art

Prior art stroke generators typically have a fixed character memory with fixed Δx and Δy steps that define the strokes that make up a character to be displayed. As an example of a prior art stroke generator, reference is made to U.S. Pat. No. 4,115,863 entitled "Digital Stroke Display with Vector, Circle and Character Generation Capability", issued to Richard R. Brown on Sept. 19, 1978 and assigned to the assignee of the present invention. The use of fixed character memory is often undesirable in that it prevents any dynamic rotation of the character set. A minor improvement can be had by replacing the fixed character memory with a programmable memory (RAM). This approach enables the rotation of characters through direct manipulation of the Δx and Δy steps which make up the character as generated by the host processor. The host processor must compute the rotated stroke angle and the correesponding Δx and Δy steps. For displays that contain many different rotating characters, the computation burden of rotating many characters may be prohibitive.

SUMMARY OF THE INVENTION

The present invention enables the host processor to dynamically rotate characters simply by specifying the angle of rotation or offset angle for the rotated characters. The fixed character memory specifies the non-rotated character in terms of stroke angles rather than in terms of Δx and Δy steps. Thus each stroke or vector of each character is specified in terms of a vector angle with respect to a reference axis, which may be the x axis or y axis of the display face. The offset angle is stored in a latch and summed with each vector angle in an angle adder which provides draw angles corresponding to each vector angle rotated by the predetermined offset angle. The invention thus requires the host processor to furnish only the rotation angle or offset angle, while the invention computes the new drawing angle.

The drawing angle is supplied to an angle to(Δx, Δy) converter which may be a look up memory (PROM). The converter computes the Δx and Δy steps corresponding to the drawing angle, thereby relieving the host processor of this computation burden. The Δx and Δy steps so computed are stored in respective accumulators for ultimate conversion into analog format by respective d/a converters. The analog signals are then used to drive a conventional writing means such as a cathode ray tube display having x and y deflection means for deflecting a beam along the x and y axis of the display face.

The character memory also provides character attribute information, such as brightness, color, or blanking, as well as character stroke information relative to the length of each vector making up a character.

DESCRIPTION OF THE PREFERRED EMBODIMENT

Figure 1A:
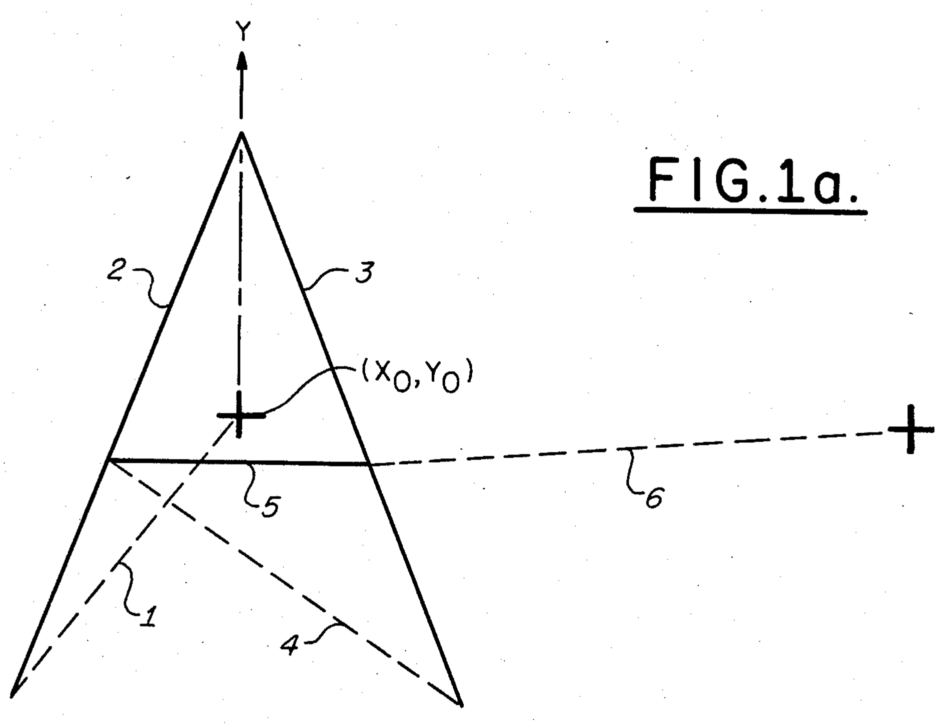
FIG. 1*a* illustrates a typical symbol or character in its unrotated state, specifically the letter "A"
Figure 1B:
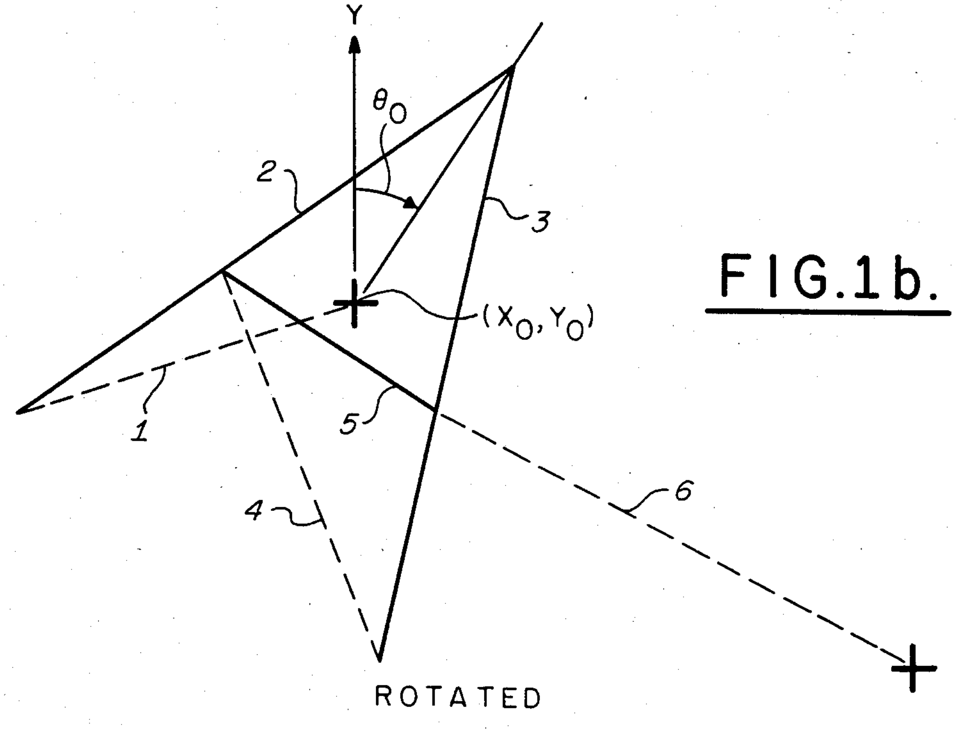
FIG. 1*b* illustrates the same symbol or character rotated by a predetermined offset angle.

The present invention is useful for displaying characters or symbols such as vectors, circles, and alphanumeric characters on the display face of any display apparatus having x and y display axes and having means for positioning or writing a symbol or character along those axes. The invention will be described in part by reference to a typical character or symbol which might be drawn on the display face. FIGS. 1*a* and 1*b* illustrate one such typical character, namely the letter "A". In FIG. 1*a* the letter "A" is centered at position $x_0$, $y_0$, and in FIG. 1*b* this same letter, centered at $x_0,y_0$, is rotated by an offset angle $\theta_0$ clockwise from the vertical. Thus in the preferred embodiment the vertical axis or y axis serves as the reference axis against which vector angles are measured. It will be apparent that the selection of the y axis is merely for convenience, other reference axes being equally applicable to the invention.

With continued reference to FIG. 1*a*, it will be seen that the letter "A" may be drawn by making the six strokes denoted by reference numerals 1 through 6. In FIG. 1 bold or solid lines denote visible strokes and broken or dashed lines denote blanked strokes. The quality of being visible or blanked shall be referred to herein as attributes. Other attributes such as brightness or color may also be implemented in particular applications, as will be apparent to those skilled in the art.

Table 1 below sets forth six stroke commands as might be executed by the invention to generate a typical letter "A". The angles delineated in Table 1 are measured with respect to the vertical or Y axis and the lengths of each stroke are scaled for a 0.125 inch high character.

TABLE 1

Stroke Commands for "A"

| Stroke # | Angle | Length | Attributes | Last Stroke? |
|---|---|---|---|---|
| 1 | −142° | 0.079" | Blanked | No |
| 2 | 21° | 0.134" | Visible | No |
| 3 | 159° | 0.134" | Visible | No |
| 4 | −56° | 0.092" | Blanked | No |
| 5 | 90° | 0.092" | Visible | No |
| 6 | 85° | 0.119" | Blanked | Yes |

Figure 2A:
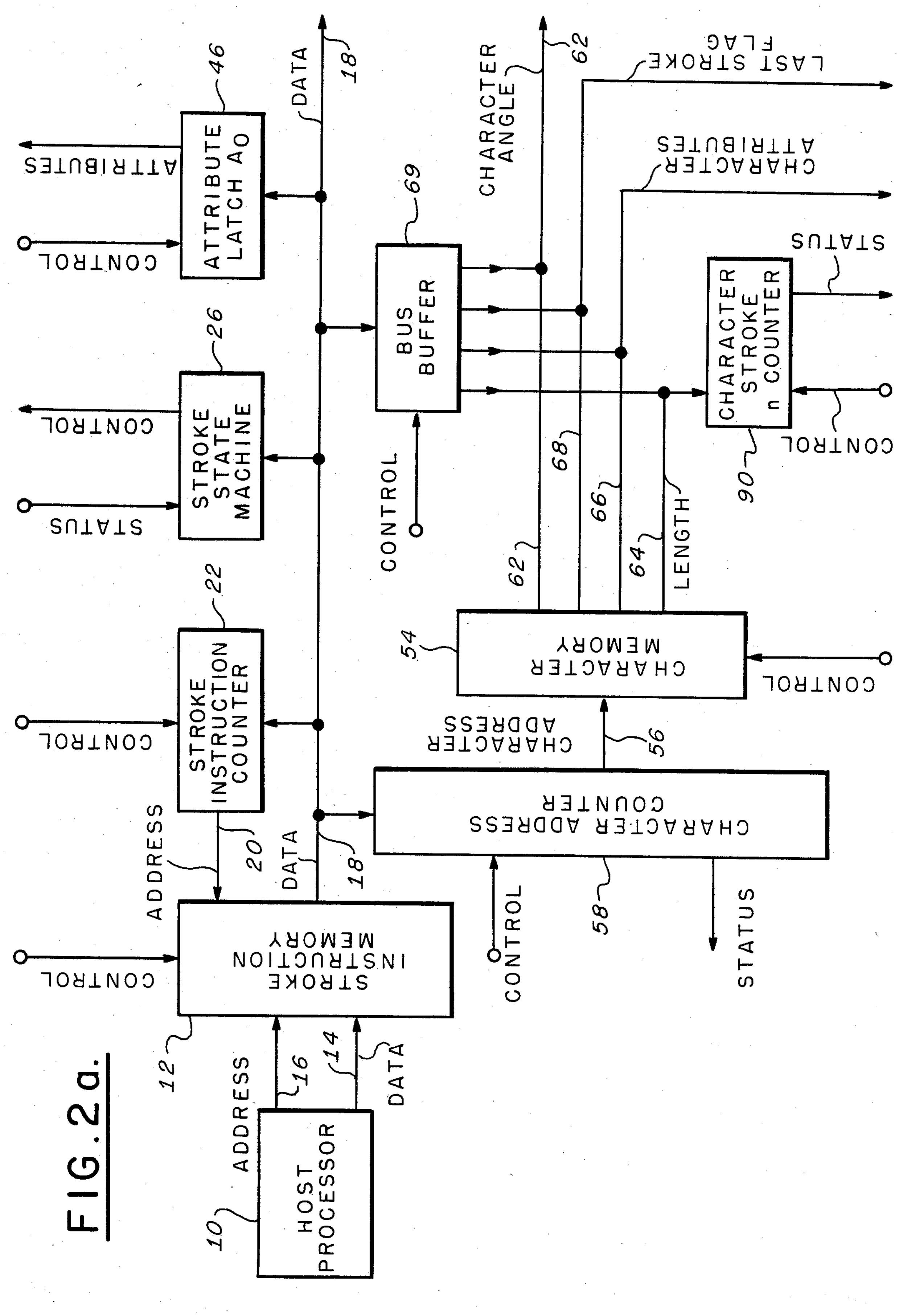
FIGS. 2A and 2B illustrate a schematic block diagram of the invention.
Figure 2B:
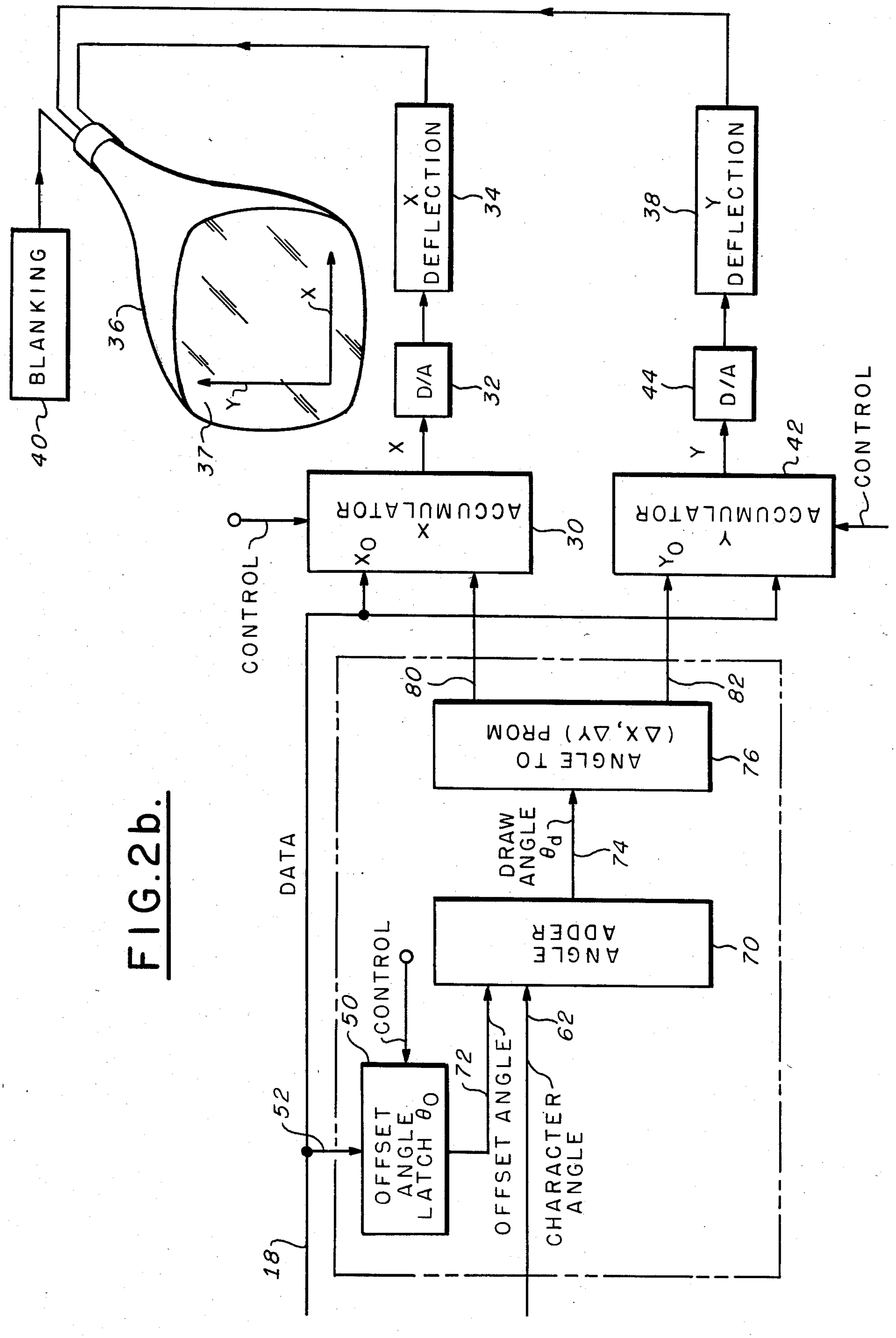

With reference to FIG. 2, the presently preferred embodiment is shown in conjunction with a conventional host processor 10 for supplying digital commands which specifiy a particular vector, symbol, or character including its position in an x, y Cartesian reference frame, as well as its offset angle or degree of rotation with respect to a reference axis. The host processor may be implemented using a commercially available microprocessor in the fashion taught in U.S. Pat. No. 4,115,863 referenced above.

For example, considering the task of drawing the letter "A" centered at position $x_0,y_0$ and rotated at an angle $\theta_0$ clockwise from the vertical, as depicted in FIG. 1*b*, the host processor 10 might place the following commands into a stroke instruction memory 12 via data bus 14 under the control of address bus 16.

Set $X=X_0$
Set $Y=Y_0$
Set Attributes$=A_0$
Set Offset Angle$=\theta_0$
Draw Character "A"

The stroke instruction memory 12 may be any conventional, commercially available memory device having a data bus 18 on which output data may be placed and having an address bus 20 coupled from the stroke instruction counter 22. Address bus 20 is coupled to a stroke instruction counter 22 which generates stroke instruction addresses, in response to control signals received from the stroke state machine 26, and places them on the address bus 20. The stroke instruction counter 22 is also coupled to receive data from data bus 18 in response to signals from the stroke state machine 26. Stroke state machine 26 is coupled to data bus 18 and fetches stroke instructions from the stroke instruction memory 12. The stroke state machine 26 identifies each instruction and executes it, receiving status signals and distributing control signals as delineated in Table II.

TABLE II

| Signal | Function |
|---|---|
| Control to STROKE INSTRUCTION MEMORY 12 | Data write from HOST PROCESSOR 10 into MEMORY 12 (Note 1)<br>Data read from MEMORY 12 onto data bus 18 |
| Control to STROKE INSTRUCTION COUNTER 22 | Load data from data bus 18 into COUNTER 22<br>Increment COUNTER 22 |
| Control to ATTRIBUTE LATCH 46 | Load data from data bus 18 into LATCH 46 |
| Control to CHARACTER ADDRESS COUNTER 58 | Load data from data bus 18 into COUNTER 58<br>Increment COUNTER 58<br>Decrement COUNTER 58 (Note 4) |
| Control to CHARACTER MEMORY 54 | Load MEMORY 54 from data buses 62,64,66,68 (Note 2)<br>Output data from MEMORY 54 onto buses 62,64,66,68 (Note 3) |
| Control to BUS BUFFER 69 | Pass data from bus 18 onto buses 62,64,66,68 (Note 3) |
| Control to CHARACTER STROKE COUNTER 90 | Load COUNTER 90 from length bus 64<br>Decrement COUNTER 90 |
| Control to OFFSET ANGLE LATCH 50 | Load LATCH 50 from data bus 18 |
| Control to ACCUMULATOR 30 | Load ACCUMULATOR 30 from data bus 18<br>Add Δx 80 to ACCUMULATOR 30 value |
| Control to ACCUMULATOR 42 | Load ACCUMULATOR 42 from data bus 18<br>Add Δy 82 to ACCUMULATOR 42 |
| Status from CHARACTER ADDRESS COUNTER 58 | COUNTER 58 contents = 0 (Note 4) |
| Status from CHARACTER STROKE COUNTER 90 | COUNTER 90 contents = 0 |
| Last stroke flag from CHARACTER MEMORY 54 | Status to STROKE STATE MACHINE 26 |

Note 1 - Signal only needed if MEMORY 12 implemented as RAM
Note 2 - Signal only needed if CHARACTER MEMORY 54 implemented as RAM
Note 3 - Signal only needed if bus buffer is used
Note 4 - Signal only needed if drawing simple vectors When the instruction "Set $x=x_0$" is fetched by stroke state machine 26 and executed, the value $x_0$ is loaded via data bus 18 into an x accumulator 30. The output of x accumulator 30 is coupled to an x deflection digital to analog converter 32 which provides x deflection signals to the x deflection section 34 of a display means 36. The display means 36 may be a conventional cathode ray tube display (CRT) wherein an electron beam is swept across a phosphorescent display face 37. It will be understood that the beam is positionable along x and y display axes of the display face by means of x and y deflection plates (not shown) under the control of signals from the x deflection section 34 and y deflection section 38. The conventional display means also includes a blanking section 40 for blanking or interrupting the beam to thereby render any strokes invisible. While the invention is described herein in connection with a conventional CRT display, it will be appreciated that other equivalent displays may be utilized. These include liquid crystal displays, dot matrix printers, x, y plotters, color displays, and so forth.

After loading the value $x_0$ in the x accumulator 30, the stroke state machine 26 fetches and executes the next command stored in stroke instruction memory 12. In the generation of the letter "A" the next command or instruction is "Set $y=y_0$". It will, of course, be appreciated that the sequence of command described herein is for the generation of the tyopical letter "A". Different command sequences would be stored in stroke instruction memory 12 for different symbols or characters as might be readily constructed by those skilled in the art. The stroke state machine 26 executes the command "Set $y=y_0$" by fetching the $y_0$ value and loading that value into the y accumulator 42 via data bus 18. The output of y accumulator 42 is coupled to a y deflection digital to analog converter 44 whose output is coupled to the y deflection section 38 of the display means.

Next the instruction "Set Attributes$=A_0$" is fetched and executed by the stroke state machine 26, by loading the value $A_0$ into an attribute latch 46 via data bus 18. It will be recalled that for the generation of letter "A" the attribute refers to the quality of a particular stroke being visible or blanked, and it will be seen that this attribute information ultimately controls the blanking section 40 of the display means. In more elaborate displays the atrribute signal may be extended to control other qualities such as brightness, dashed/solid lines, blinking, or color, for example.

Next the stroke state machine fetches the instruction "Set Offset Angle$=\theta_0$" and loads $\theta_0$ into an offset angle latch 50 via a bus 52 coupled to data bus 18. The offset angle $\theta_0$, shown in FIG. 1*b*, is a measure of the desired character rotation referenced to some predetermined reference axis. In the preferred embodiment the y display axis is chosen as the reference axis.

Having loaded the center position $(x_0,y_0)$ about which the letter "A" is centered, the attribute instruction, and the offset angle $\theta_0$, the stroke display apparatus of the present invention is now set up to draw the character constituting a series of concatanated strokes or vectors. The stroke commands specifying the stroke number, direction or angle, length, attributes, and last stroke flag needed to generate the unrotated character are stored in a character memory 54. As an example, Table I sets forth the stroke commands for the letter "A". The character memory is addressed via character address bus 56 which is coupled to a character address counter 58. The character address counter 58 is in turn coupled to data bus 18. The stroke state machine 26, upon fetching the instruction "Draw Character A", loads the starting address contained in this instruction, of the stroke commands for the character into the character address counter 58 via data bus 18. The character address counter 58 generates the address for the first stroke or vector of the character to be drawn and places this on character address bus 56, thereby fetching the unrotated first stroke data from character memory 54. This unrotated first stroke data includes the character stroke angle which is placed on character angle bus 62, character length which is placed on length bus 64, character attributes which is placed on character attributes bus 66, and last stroke flag which is placed on last stroke flag bus 68. Bus buffer 69 isolates buses 62, 64, 66, and 68 from bus 18 by storing data coupled thereto from bus 18 for subsequent distribution.

The character angle on character angle bus 62 is loaded into an angle adder 70. Also loaded into angle adder 70 via lead 72 is the offset angle $\theta_0$ which is stored in offset angle latch 50. The angle adder 70 adds the unrotated character stroke angle to the offset angle, thereby generating a draw angle $\theta_d$ which is placed on draw angle bus 74. Draw angle bus 74 is coupled to an angle-to-($\Delta x,\Delta y$) converter 76. The converter 76, which may be implemented by means of a lookup table stored in memory such as a programmable read only memory (PROM), converts the drawing angle into orthogonal incremental signals or $\Delta x$ and $\Delta y$ steps defining the stroke or vector rotated by the offset angle. The conversion may be viewed as transforming the character angle from a polar coordinate system to a Cartesian coordinate system where the following relationship applies:

$$\Delta x = k \sin(\theta_d)$$

$$\Delta y = k \cos(\theta_d)$$

Figure 3:
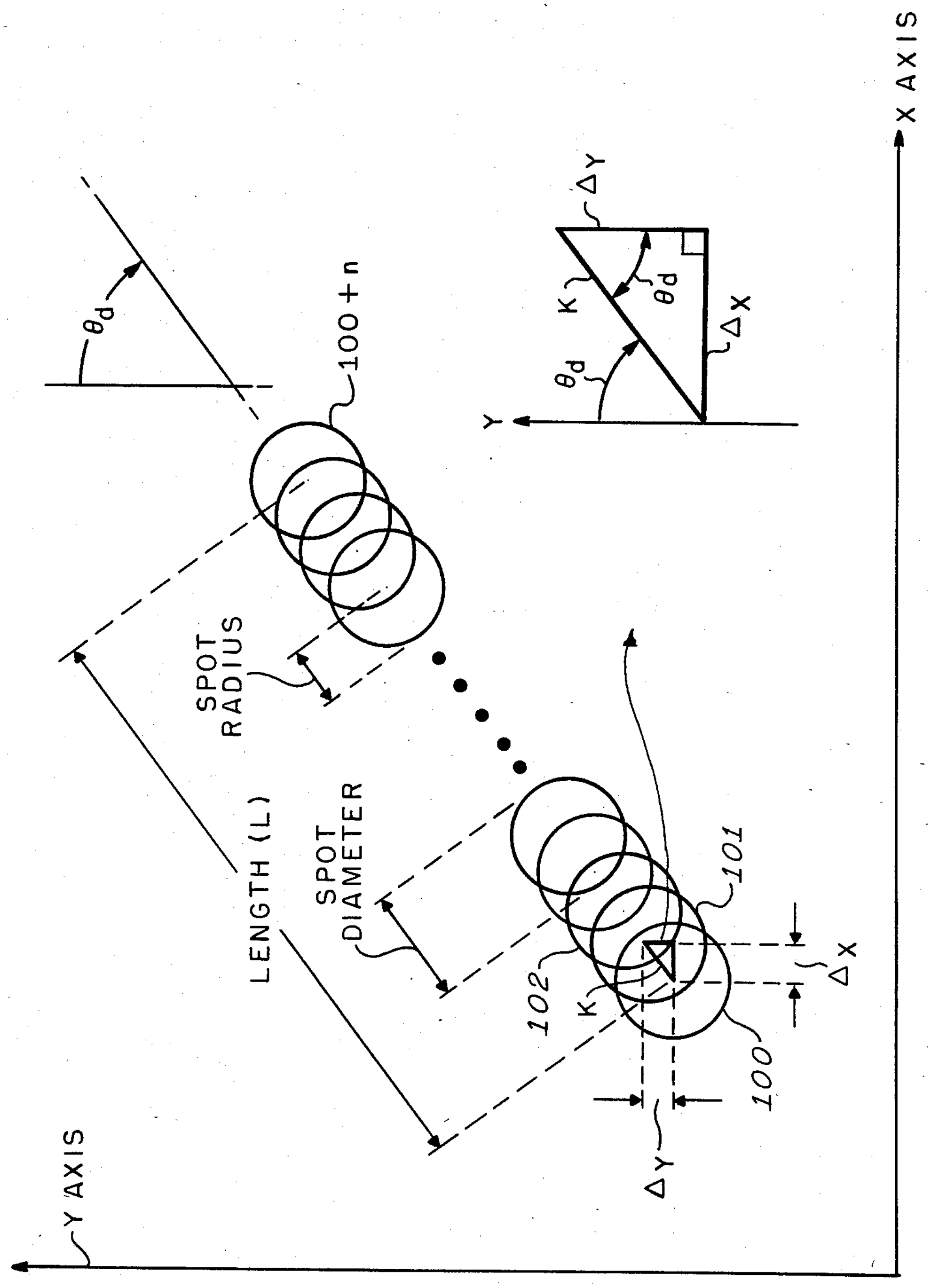
FIG. 3 is a graph illustrating parameters utilized in the vector generation of the present invention.

In the above relationships k denotes the length or magnitude of an incremental vector segment equal to the hypotenuse of the right triangle having legs $\Delta x$ and $\Delta y$ respectively. The length k and its relationship to $\Delta x$ and $\Delta y$ is shown in the inset of FIG. 3. The $\Delta x$ value is output on bus 80 to the x accumulator 30 and the $\Delta y$ value is output on bus 82 to the y accumulator 42. In the accumulators the $\Delta x$ and $\Delta y$ values are summed with the initial or starting values $x_0$ and $y_0$ and the sums stored in the accumulators, replacing the initial values. The new values stored in accumulators 30 and 42 thus represent the x and y coordinates of the end point of an incremental stroke or vector originating at $x_0$, $y_0$. The digital to analog converters 32 and 44 convert this digital vector information into analog voltages for deflecting or drawing the incremental vector or stroke on the display face 37 of the display means. The first stroke is drawn by concatanating a series of these incremental vectors until the desired stroke length is reached. If the draw angle is held constant for the series of concatanations, the stroke will appear as a straight line on the display face, however, if the draw angle is changed during concatanation, a curve is drawn. It will be understood that by concatanating a large number of very small incremental steps, a smooth curve or circle can be closely approximated.

The apparent smoothness of a line or curve is dependent upon the diameter or radius of the smallest spot, pixel, or dot reproducible by the particular display means. In a cathode ray tube display system the spot diameter or spot radius affects the apparent smoothness of a line or curve. Referring to FIG. 3, a typical stroke comprising a series of concatanated incremental vectors is shown. Also shown are a plurality of consecutively drawn spots 100, 101, 102, . . . 100+n corresponding to the concatanated incremental steps. In the preferred embodiment the length of each incremental vector segment k is restricted to be less than or equal to the sopt radius. This assures the apparent smoothness of a line or curve. Utilizing the Pythagorean theorem. it will be seen that the incremental length $k=(\Delta x^2+\Delta y^2)^{\frac{1}{2}}$. A stroke or vector line of length L may thus be generated by successively adding $\Delta x$ and $\Delta y$ steps to the current x, y position n times; where n is the number of iterations. Thus it will be seen that $L=nk$.

The number of iterations n is controlled by character stroke counter 90 which receives the stroke length information from character memory 54 on length bus 64. The character stroke counter 90 thus counts the number of iterations or incremental vector segments drawn and signifies when the appropriate stroke length is reached. Character memory 54 also outputs the character attribute signal on lead 66 which controls the blanking section 40 to determine whether the stroke being drawn is visible or blanked . Character memory 54 also outputs a last stroke flag on bus 68 signifying when the character is complete.

After the first stroke of the character is completed, the status of the last stroke flag is checked to determine whether the last stroke flag is set. If the last stroke flag is not set, such as for the first five strokes of the letter "A" of Table I, then the character address counter 58 is incremented to address the next stroke of the character stored in character memory 54 and the process is repeated for that stroke. If the last stroke flag is set, then the character is complete and the stroke state machine 26 executes the next instruction.

It will thus be seen that the present invention enables the host processor to dynamically rotate characters by simply specifying the angle of rotation for the rotated characters. The present invention significantly relieves the host processor of much of its computation burden by providing hardware for representing stroke vectors in terms of stroke angles rather than $\Delta x$ and $\Delta y$ steps. The hardware then computes the new drawing angle and then converts this new drawing angle into the corresponding $\Delta x$ and $\Delta y$ steps. The invention is, therefore, compatible with prior art display means utilizing $\Delta x$ and $\Delta y$ deflection commands.

The present invention also may be used to position or reposition a character or symbol by translating it to a different location on the display face. The invention accomplishes this task without the need to perform multiplications. For example, the problem of drawing a character or symbol at a point ($x_2$,$y_2$) rotating about a known fixed point ($x_1$,$y_1$), the prior art host processor needed to compute the point ($x_2$,$y_2$) as follows:

$$x_2 = x_1 + R_1 \sin(\theta_1)$$

$$y_2 = y_1 + R_1 \cos(\theta_1)$$

The steps required to multiply $R_1$ times either the sine or cosine terms requires a number of time consuming host processor computations.

Figure 4:
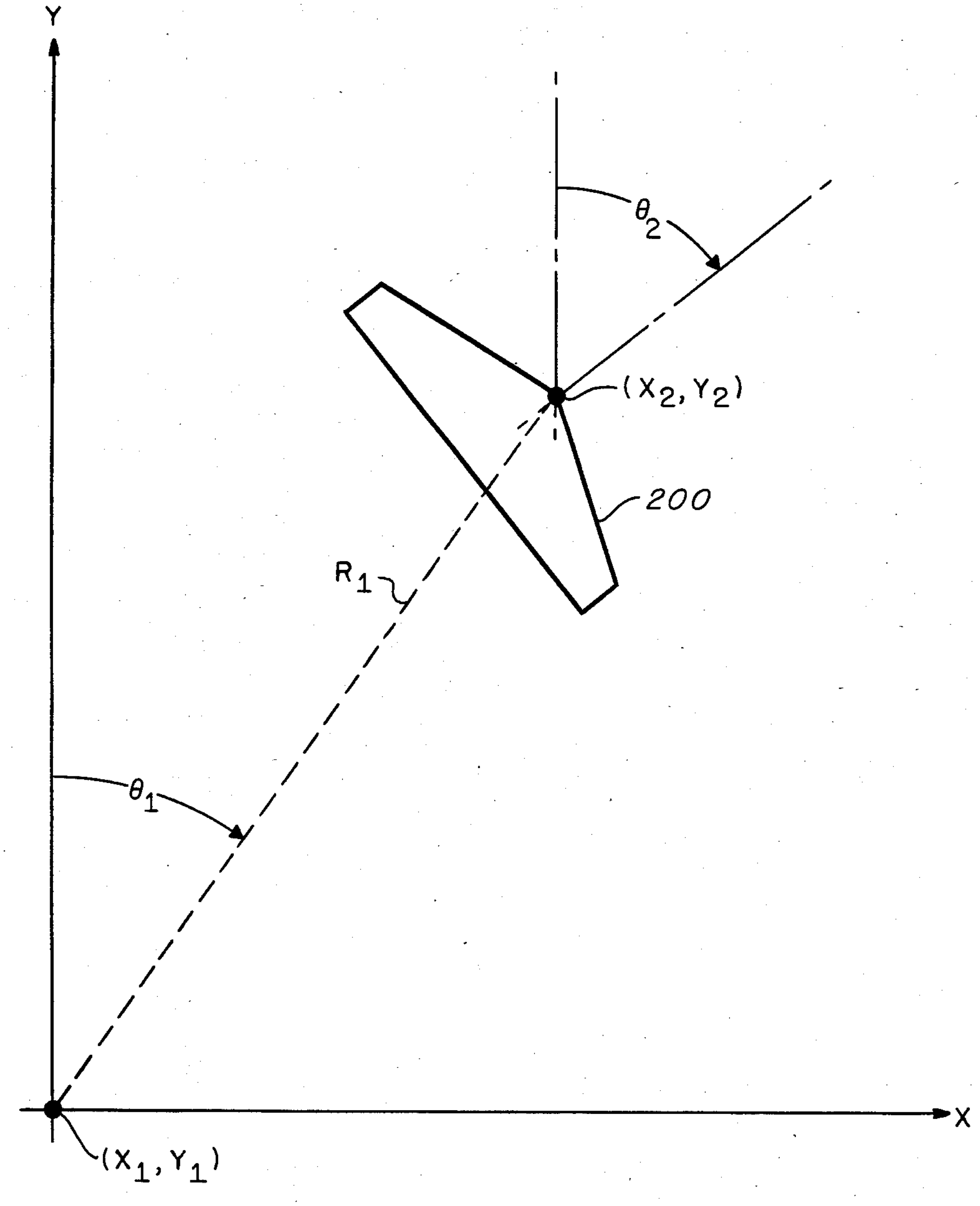
FIG. 4 is a graph illustrating the figure repositioning feature of the present invention.

FIG. 4 illustrates this translation problem. In FIG. 4 the character to be drawn has the appearance of an aircraft wing and is denoted by reference numeral 200. The known fixed point $(x_1,y_1)$ is shown for purposes of illustration to be located at the origin of an x,y Cartesian coordinate system. A remote point $(x_2,y_2)$ located a distance $R_1$ from point $(x_1,y_1)$ at an angle $\theta_1$ from the y axis defines one point on the character 200. $R_1$ may be considered as a translation/rotation positioning vector, and is shown in broken lines in FIG. 4 to denote that it would be drawn with the beam blanked. Thus the point $(x_1,y_1)$ becomes the center of translation/rotation. It may be desired that the character 200 be rotated by an offset angle $\theta_2$ as shown in FIG. 4.

With the present invention in order to produce the character 200 translated by the vector $R_1$ it is necessary only to include an additional stroke command for vector $R_1$ prior to the stroke commands used to generate the character 200. A blanked stroke is utilized for this purpose. Then, if it is also desired to rotate the translated character by offset angle $\theta_2$, this is accomplished by loading the value $\theta_2$ into the offset latch 50 as discussed above. It will be seen that the character 200 may be given apparent motion by dynamically varying $\theta_1$, $R_1$, and $\theta_2$ over successive iterations of the stroke display.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Stroke display apparatus having display means with display face and writing means positonable along x and y display axes for writing vectors of predetermined length, origin, and slope, and for dynamically rotating said vectors by a predetermined offset angle supplied by a host computer, said stroke display apparatus comprising:

means for representing said vectors in terms of a vector angle with respect to a reference axis of said display face including first memory means for storing a plurality of vector angles, and first memory addressing means coupled to said first memory means for addressing said plurality of vector angles, means for latching said predetermined offset angle provided by said host computer, means for summing said vector angle and said latched offset angle, thereby providing a draw angle, means responsive to said draw angle for providing first and second orthogonal signals representing incremental steps defining said vector rotated by said predetermined offset angle, and means responsive to said first and second orthogonal signals for writing said vector rotated by said offset angle on said display face.

2. The apparatus according to claim 1 wherein said means for providing first and second orthogonal signals comprises second memory means responsive to said summing means for providing a $\Delta x$ signal representing incremental steps parallel to said x display axis, and for providing a $\Delta y$ signal representing incremental steps parallel to said y display axis.

3. The apparatus according to claim 2 wherein said $\Delta x$ signal is proportional to the sine of said draw angle and said $\Delta y$ signal is proportional to the cosine of said draw angle.

4. The apparatus according to claim 1 wherein said writing means comprises cathode ray tube means having a beam and x and y deflection means for deflecting said beam along said x and y axis respectively.

5. The apparatus according to claim 4 comprising first digital to analog converter means responsive to said first orthogonal signal and coupled to one of said x and y deflections means for providing a beam deflection signal thereto, and second digital to analog converter means responsive to said second orthogonal signal and coupled to the other of said x and y deflection means for providing a beam deflection signal thereto.

* * * * *